United States Patent
Harada et al.

(10) Patent No.: US 7,998,621 B2
(45) Date of Patent: Aug. 16, 2011

(54) COLLECTOR, BATTERY ELECTRODE SUBSTRATE, AND METHODS FOR PRODUCING THE SAME

(75) Inventors: Keizo Harada, Itami (JP); Masahiro Kato, Itami (JP); Hidetoshi Saito, Imizu (JP); Tadashi Omura, Imizu (JP); Hitoshi Tsuchida, Imizu (JP)

(73) Assignees: Sumitomo Electric Industries, Ltd., Osaka (JP); Sumitomo Electric Toyama Co., Ltd., Imizu-Shi (JP)

( * ) Notice: Subject to any disclaimer, the term of this patent is extended or adjusted under 35 U.S.C. 154(b) by 1537 days.

(21) Appl. No.: 11/328,219

(22) Filed: Jan. 10, 2006

(65) Prior Publication Data

US 2006/0159998 A1 Jul. 20, 2006

(30) Foreign Application Priority Data

Jan. 14, 2005 (JP) ................ 2005-007693
Feb. 9, 2005 (JP) ................ 2005-032667
Mar. 29, 2005 (JP) ................ 2005-093703
Nov. 30, 2005 (JP) ................ 2005-345000

(51) Int. Cl.
*H01M 4/66* (2006.01)
*H01M 4/70* (2006.01)
*H01M 4/80* (2006.01)
*B32B 15/085* (2006.01)

(52) U.S. Cl. ....... 429/236; 429/234; 429/245; 29/623.5; 428/389

(58) Field of Classification Search ........................ None
See application file for complete search history.

(56) References Cited

U.S. PATENT DOCUMENTS 3,344,013 A * 9/1967 Fahrbach ................ 442/328
6,485,865 B1 * 11/2002 Sugikawa ................ 429/235

FOREIGN PATENT DOCUMENTS

| JP | 61-76686 A | 4/1986 |
| JP | 2-216766 A | 8/1990 |
| JP | 08-203534 | 8/1996 |
| JP | 2001-313038 A | 11/2001 |
| JP | 2003-109600 A | 4/2003 |
| JP | 2003-282066 A | 10/2003 |
| JP | 2004-127567 | 4/2004 |

OTHER PUBLICATIONS

Machine translation of JP 2003-109600, Apr. 2003.*
Japanese Office Action, with English concise explanation of relevance, issued in Japanese Patent Application No. 2005-345000, mailed Feb. 15, 2010.

* cited by examiner

*Primary Examiner* — Jonathan Crepeau
(74) *Attorney, Agent, or Firm* — McDermott Will & Emery LLP

(57) ABSTRACT

A battery electrode substrate includes a metallic porous body. The metallic porous body has a structure in which a surface of a plastic fiber in a woven or unwoven fabric is coated with a nickel film. The nickel film coats the surface with an average coverage ratio of not less than 85%.

13 Claims, 3 Drawing Sheets

CROSS-SECTIONAL MICROSTRUCTURE OF A METALLIC POROUS BODY ACCORDING TO THE INVENTION

CROSS-SECTIONAL MICROSTRUCTURE OF A METALLIC
POROUS BODY ACCORDING TO THE INVENTION

STRUCTURE OF A METALLIC POROUS BODY ACCORDING
TO THE INVENTION

WATER

AIR BUBBLE

MICROFILTRATION
MEMBRANCE

COMPRESSED AIR

A

B

COLLECTOR, BATTERY ELECTRODE SUBSTRATE, AND METHODS FOR PRODUCING THE SAME

BACKGROUND OF THE INVENTION

1. Technical Field

The invention relates to a collector used in, for example, alkaline secondary batteries, and to a battery electrode substrate that uses the collector.

2. Background Art

The collectors developed so far and used in alkaline secondary batteries or the like include the following.

For example in Patent Document 1, a metallic porous body obtained by the three-dimensional entanglement of metal fibers is applied to the collector for an alkaline secondary battery. The metal fiber diameter, pore diameter, porosity, and density optimal for the collector are specified therein. Within the sphere of methods for fabricating porous metal structures, Patent Document 2 discloses a method in which a conductive layer is formed on a polymer core material such as unwoven fabric by a vapor-phase method such as sputtering, followed by formation of a metal layer by electroplating. In Patent Document 3, unwoven fabric material is subjected to a surface treatment such as sulfonation, and a nickel plating film is then formed thereon; this is used as a collector material for alkaline secondary batteries. It is described that flexibility and strength are secured by letting a polymer unwoven fabric remain as the core material. Patent Document 4 discloses a high-capacity collector material capable of high-rate charge/discharge, which is obtained by specifying the amount of plating on the surface of unwoven fabric in terms of the cross-sectional area. Patent Document 5 discloses a collector material capable of high-rate charge/discharge, which is obtained by specifying the thickness of unwoven fabric material, and the method of fabrication.

Patent Document 1: Japanese Patent Publication No. H2-216766
Patent Document 2: Japanese Patent Publication No. S61-76686
Patent Document 3: Japanese Patent Publication No. 2001-313038
Patent Document 4: Japanese Patent Publication No. 2003-109600
Patent Document 5: Japanese Patent Publication No. 2003-282066

The collectors described in Patent Documents 1 and 2, however, exhibit an unsatisfactory collector strength and flexibility. They are also expensive due to their use of large amounts of Ni. The prior art in Patent Documents 1 and 2, being composed of only metal fiber, requires an increase in the amount of metal in order to secure strength; however, the increased amount of metal results in a loss of flexibility and protrusion of the metal fiber through the separator, causing short circuiting. The cost is also driven up due to the large amounts of expensive Ni metal. A reduction in the amount of metal in pursuit of lower costs not only results in deficient strength, but also in an increase in electrical resistance and impaired high-rate charge/discharge characteristics.

The prior art described in Patent Documents 3 to 5 first of all suffers from a high electrical resistance. It also exhibits a reduced cycle life due to inadequate film adhesiveness. The high electrical resistance in this prior art is understood to be caused by deficient coverage on the fiber surface by the metal film. An inexpensive substrate is obtained if amount of Ni plating on the unwoven fabric surface is smaller. In this case, however, the small amount of Ni on the unwoven fabric surface results in impaired current flow, increase in the electrical resistance, and reduction in the output characteristics. The collection performance is also diminished by film exfoliation caused by the expansion and shrinkage associated with repetitive charging and discharging, which results in reduced battery cycle characteristics. Another problem has been the substantial increase in the resistance of the substrate because of winding. The unwoven fabric is bent by winding, which causes exfoliation of the metal layer plated on the surface and increase in electrical resistance.

DISCLOSURE OF THE INVENTION

An object of the invention is, therefore, to solve the problems identified above in the prior art, and, more specifically, is to provide a battery electrode substrate that exhibits satisfactory strength and flexibility. Another object of the invention is to provide a low-cost battery electrode substrate that nevertheless exhibits excellent high-rate charge/discharge characteristics. Yet another object of the invention is to provide a battery electrode substrate that has a low electrical resistance and that can eliminate the decline in cycle characteristics caused by repetitive charge/discharge. Still another object of the invention is to provide a battery electrode substrate that can lower the amount of Ni plating and the electrical resistance of the substrate.

As a result of diligent investigations, the inventors discovered that the aforesaid objects are achieved by an electrode substrate according to (1) to (4) below, an electrode substrate afforded by the method of fabrication (5), a collector according to (6) to (8), an electrode substrate according to (9), collector afforded by the methods of fabrication (10) and (11), and an electrode substrate afforded by the methods of fabrication (12) and (13).

(1) A battery electrode substrate comprising a metallic porous body, the metallic porous body having a structure in which a surface of a plastic fiber in a woven or unwoven fabric is coated with a nickel film, and the nickel film coating the surface with an average coverage ratio of not less than 85%.

(2) A battery electrode substrate according to (1), wherein the plastic fiber has a core/sheath composite fiber structure whose core is polypropylene (PP) and whose sheath is polyethylene (PE), and a core/sheath ratio of the PP/PE is within a range of 2/1 to 1/4.

(3) A battery electrode substrate according to (1), wherein an areal density of said nickel film is not less than 50 $g/m^2$ and not more than 300 $g/m^2$.

(4) A battery electrode substrate according to (1), wherein a 30% cumulative volume of pore size of the metallic porous body in a pore size measurement by bubble point method is not less than 20 μm and not more than 100 μm.

(5) A method for producing a battery electrode substrate according to (1), comprising a step of producing the metallic porous body, the step comprising:

forming a nickel film whose areal density is of 0.3 $g/m^2$ to 10 $g/m^2$ on a surface of a plastic fiber of a woven or unwoven fabric by a vapor-phase method selected from a sputtering method, a vacuum deposition method, and an ion plating method; and further coating the surface with a nickel film by electroplating.

(6) A collector comprising a metallic porous body, wherein the metallic porous body has a structure in which a surface of a plastic fiber of a woven or unwoven fabric is coated with a nickel film so as to be an average coverage ratio of not less than 85%, the metallic porous body comprises at least two layers of a lower density region and a higher density region in a thickness direction between which there is a difference in density of included nickel, and a thickness of the lower density region is not less than 1.5-times a thickness of the higher density region.

(7) A collector according to (6), wherein the plastic fiber has a core/sheath composite fiber structure whose core is polypropylene (PP) and whose sheath is polyethylene (PE), and a core/sheath ratio of the PP/PE is in the range of 2/1 to 1/4.

(8) A collector according to (6), wherein a density of nickel included in the higher density region is not less than 0.8 g/cc and not more than 4 g/cc, and a density of nickel included in the lower density region is less than 0.8 g/cc but not less than 0.1 g/cc.

(9) A battery electrode substrate, wherein a battery active substance is filled in a collector according to (6).

(10) A method for producing a collector according to (6), comprising a step of producing the metallic porous body, the step comprising:

preparing a woven or unwoven fabric comprising a plastic fiber that comprises at least two layers of a lower density region and a higher density region in a thickness: direction between which there is a difference in density of included nickel, with a thickness of the lower density region being not less than 1.5-times a thickness of the higher density region;

forming a nickel film whose areal density is of 0.3 g/m$^2$ to 10 g/m$^2$ on a surface of the plastic fiber by a vapor-phase method selected from a sputtering method, a vacuum deposition method, and an ion plating method; and further coating the surface with a nickel film by electroplating.

(11) A method for producing a collector according to (6), comprising a step of producing the metallic porous body, the step comprising:

forming a first nickel film whose areal density is of 0.3 g/m$^2$ to 10 g/m$^2$ on a surface of a plastic fiber of an woven or unwoven fabric by a vapor-phase method selected from a sputtering method, a vacuum deposition method and an ion plating method; and further coating the surface with a second nickel film by a gradient electroplating method so as to make the second nickel film comprise at least two layers of a lower density region and a higher density region in a thickness direction in which there is a difference in density of nickel included and a thickness of the lower density region is not less than 1.5-times a thickness of the higher density region.

(12) A method for producing a battery electrode substrate according to (9), comprising the steps of:

fabricating the metallic porous body by a process comprising the steps of:

preparing a woven or unwoven fabric as a base material, the fabric comprising a plastic fiber that comprises at least two layers of a lower density region and a higher density region in a thickness direction between which there is a difference in density of included nickel, and a thickness of the lower density region being not less than 1.5-times a thickness of the higher density region, forming a nickel film whose areal density is of 0.3 g/m$^2$ to 10 g/m$^2$ on a surface of the plastic fiber by a vapor-phase method selected from a sputtering method, a vacuum deposition method and an ion plating method, and further coating the surface with a nickel film by electroplating;

fabricating a collector by use of the metallic porous body; and filling a battery active substance in the collector.

(13) A method for producing a battery electrode substrate according to (9), comprising the steps of:

fabricating the metallic porous body by a process comprising the steps of:

forming a first nickel film whose areal density is of 0.3 g/m$^2$ to 10 g/m$^2$ on a surface of a plastic fiber of an woven or unwoven fabric by a vapor-phase method selected from a sputtering method, a vacuum deposition method and an ion plating method, and further coating the surface with a second nickel film by a gradient electroplating method so as to make the second nickel film comprise at least two layers of a lower density region and a higher density region in a thickness direction in which there is a difference in density of nickel included and a thickness of the lower density region is not less than 1.5-times a thickness of the higher density region;

fabricating a collector by use of the metallic porous body; and filling a battery active substance in the collector.

When a battery electrode substrate is fabricated using a metallic porous body that employs a plastic fiber, the presence of the fiber surface regions uncoated with nickel film causes a high electrical resistance for the substrate. In addition, film coming off and separation are caused in a battery that was fabricated using such an electrode substrate by substrate expansion and shrinkage during battery charge/discharge. This causes further increase in electrical resistance and deterioration in the battery characteristics with each excursion of a cycle. As a result of detailed investigations of the relationship between the metal coverage ratio on the plastic fibers and, the electrical resistance and cycle characteristics, the inventors found that when the average fiber coverage ratio is not less than 85%, the electrode substrate has a low initial resistance, the rise in the electrical resistance after cycling is also low, then excellent battery characteristics are obtained. The battery electrode substrate according to the present invention realizes this.

The main functionalities required for a battery electrode substrate are retention of the active substance that carries out the battery reactions and collection of electrons. While each functionality can be realized by a uniform unwoven fabric structure, additional performance enhancements can be realized by the use of a woven or unwoven fabric structure that has a coarse/fine structure comprising a plurality of regions including a lower density region layer whose main purpose is active material retention and a higher density region layer whose main purpose is the collection of electrons at the lead. Since filling larger amounts of active substance is necessary in order to secure the battery capacity, it is desirable for the thickness of the lower density region layer to be not less than 1.5-times that of the higher density region layer, which is filled with less active substance. An example of the course/fine structure of the metallic porous body according to this invention is shown in FIGS. 4A and 4B.

In order to realize a coverage ratio of not less than 85% by the nickel film on the plastic fiber, the plastic fiber preferably has a core/sheath composite fiber structure in which the core is polypropylene (PP) and the sheath is polyethylene (PE). At the same time, the PP/PE core/sheath ratio is desirably in the range from 2/1 to 1/4. The use of such a plastic fiber enables an enhanced electroconductivity because of tight interfiber bonding and sure realization of a coverage ratio by the nickel film of not less than 85%. Also, this plastic fiber is desirable for battery use because materials with no leakage or breakdown in strong alkali in batteries are required.

The plastic fiber of this core/sheath composite fiber structure exhibits excellent strength characteristics thanks to strong adhesion among the plastic fibers. In addition, the electrical resistance can be reduced because electrically conductive paths among the fibers are ensured when they are coated with nickel. In the case of just simple contact among fibers without adhesion as in the prior art, the nickel film formed by electroplating is nonuniform, and, in the worst case, the substrate will display a high electrical resistance due to the fibers uncoated with nickel film. In contrast, when the PP/PE core/sheath composite fiber structure is present, the PE sheath material has a lower melting point than the PP core material, and as a consequence heat treatment of the woven or unwoven fabric brings the PE surface layer to melt while the structure of the porous body is maintained, thereby securing strong interfiber adhesion.

The areal density of the nickel film in the electrode substrate of the present invention is desirably not less than 50 g/m$^2$ and not more than 300 g/m$^2$. According to experiments by the inventors, optimal values exist for the areal density of the nickel film in the actual battery applications. The strength and electrical resistance of the electrode could be insufficient at less than 50 g/m$^2$. At more than 300 g/m$^2$, the flexibility could be lost due to the hardness of the nickel film and the risk of short-circuit arises because the fibers could protrude through the battery separator. When the nickel film is fabricated so as to satisfy the specified range of the areal density, the flexibility can be maintained and battery short circuiting can be prevented as a result of the reduction of the nickel amount. In addition, cost cut is also possible through a reduction in the amount of expensive nickel. In comparison with the areal density of the nickel film, an areal density of the plastic fiber is suitably not less than 20 g/m$^2$ and not more than 150 g/m$^2$.

In the electrode substrate of the present invention, the pore size of the metallic porous body preferably has a 30% cumulative volume of pore size (D30) of not less than 20 μm and not more than 100 μm, according to the pore size measurement by bubble point method. This is because that there is an optimal range for the pore size when this electrode substrate is used in batteries; the capability of the battery active substance filled declines drastically at a D30 less than 20 μm; while at a D30 excess of 100 μm the collection performance declines and the battery capacity and high-rate characteristics therefore lowers.

The bubble point method is proceeded as follows. A liquid that wet porous bodies (water or alcohol) is first suctioned into the pores, followed by installation into a fixture as shown in FIG. 3. Air pressure is applied from the bottom of the membrane, and the pressure is measured at which the generation of air bubbles at the membrane surface is observed. This is designated as a bubble point. The pore size is calculated from the relationship, which is shown below, between the surface tension of the liquid and this pressure. In this formula, d [m] is the pore size; θ is the angle of contact between the solvent and the material of the membrane; γ [N/m] is the surface tension of the solvent; and ΔP [Pa] is the bubble point pressure.

$$d = 4\gamma \cos \theta / \Delta P$$

The following method is suitable for producing the electrode substrate according to the invention. A nickel film with an areal density of not less than 0.3 g/m$^2$ and not more than 10 g/m$^2$ is first formed, by a vapor-phase method selected from sputtering, vacuum deposition, and ion plating, on a woven or unwoven fabric comprising the plastic fiber described hereinabove. Additional nickel film is then formed by electroplating to produce a metallic porous body. The vapor-phase methods are able to form a uniform and well-adhered electroconductive layer because the fiber surface is impacted by highly energized nickel particles. Furthermore, the effect of the core/sheath composite fiber structure described above enables to form a nickel film with a coverage ratio of not less than 85% by the follow-on electroplating.

The plastic fiber of the above-described core/sheath composite fiber structure has excellent strength characteristics because of strong adhesion among the plastic fibers. Moreover, the electrical resistance can be reduced because electrically conductive paths among the fibers are sufficiently secured when they are coated with nickel. In the case of just simple contact among fibers without adhesion as in the prior art, the nickel film coating by electroplating is nonuniform; and, in the worst case, the fibers uncoated with nickel film appear then the substrate will exhibit a high electrical resistance. In contrast, when the PP/PE core/sheath composite fiber structure is present, the PE sheath material has a lower melting point than the PP core material, then a heat treatment to the woven or unwoven fabric causes the PE surface layer to melt while the structure of the porous body is maintained, thereby strengthening interfiber adhesion.

The density of the higher density region in the collector of this invention is desirably not less than 0.8 g/cc and not more than 4 g/cc, while the density of the lower density region is desirably less than 0.8 g/cc but not less than 0.1 g/cc.

According to experiments by the inventors, there are optimal values for the density of the higher density region and that of the lower density region when the invented collector is actually used in a battery; a noticeable effect on the ability to collect electrons is not seen when the higher density region has a density of nickel included of less than 0.8 g/cc; while at over 4 g/cc, the battery capacity decreases due to a reduction of the filled amount of active substance and the flexibility is lost because the nickel film is hard and the fibers could protrude through the battery separator, causing short-circuit. A nickel film cannot be uniformly formed over the entire fiber surface when the lower density region has a density of nickel included of below 0.1 g/cc. At 0.8 g/cc or more, less active substance is filled and the battery capacity declines. In addition, fiber scission and the like occur because the nickel film is too hard and the scission impairs the collection characteristics by long-term cycling, which causes a lowering of the battery capacity.

The following method is suitable for producing a collector or electrode substrate according to the present invention.

A nickel film with an areal density of not less than 0.3 g/m$^2$ and not more than 10 g/m$^2$ is first formed by a vapor-phase method selected from sputtering, vacuum deposition and ion plating, on a substrate of a woven or unwoven fabric comprising plastic fiber and comprising at least two layers of a lower density region and a higher density region along the thickness direction in which there is a difference in density of nickel included in each other and the thickness of the lower density region is not less than 1.5-times that of the higher density region. A nickel film is further formed by electroplating to produce a metallic porous body. The vapor-phase methods are able to form a uniform and well-adhered electroconductive layer because the fiber surface is impacted by highly energized nickel particles. Moreover, a nickel film with a coverage ratio of not less than 85% can be formed by the subsequent electroplating because of the effect of the core/sheath composite fiber structure described above. The woven or unwoven fabric having a coarse/fine structure can be fabricated by adjusting the fiber diameter and fiber density of the plastic fiber used so as to have a structure having different densities of nickel in a layerwise configuration, regardless of whether the method is in wet or in dry.

The observed structure of the metallic porous body is shown in FIGS. 1 and 2, with regard to an example of the electrode substrate of the invention that uses the metallic porous body in which the average coverage ratio by the nickel film is not less than 85%. FIG. 1 shows the cross-sectional microstructure along the thickness direction as observed by an optical microscope and the results was obtained by embedding the metallic porous body of the electrode substrate of the present invention in epoxy resin followed by polishing. A nickel film of approximately constant thickness appears as a white band-like line, and what this film encompasses is the plastic fiber. The uncoated regions of the plastic fiber with the nickel film can be identified as regions where the white line is interrupted. It is confirmed from this cross-sectional view that at least 85% of the surface of the plastic fiber has been coated with nickel film. The method to evaluate the coverage ratio was that: a percentage was calculated for 20 fibers randomly selected from the cross-sectional structure shown in FIG. 1, using the length of the white, Ni-coated part on the circumference of the plastic fiber as the denominator and the length of the interrupted part as the numerator, and the coverage ratio was obtained by subtracting the percentage from 1.

An SEM image of the enlarged structure of the metallic porous body of an electrode substrate of the present invention is given in FIG. 2. Strong bonding among the fibers is observed.

A cross-sectional schematic drawing of the structure of the metallic porous body in an example of a collector according to the invention is shown in FIG. 4.

The inventors additionally discovered as a result of their investigations that the above-mentioned problems can also be solved by battery electrode substrates according to the following (14) to (18), which are other embodiments of the present invention.

(14) A battery electrode substrate that has a structure in which a surface of a plastic fiber in an unwoven fabric is coated with a nickel film, wherein the battery electrode substrate uses a metallic porous body that has anisotropy in a transverse-to-longitudinal ratio of electrical resistance.

(15) A battery electrode substrate according to (14), wherein the battery electrode substrate uses the metallic porous body that has the transverse-to-longitudinal ratio of electrical resistance of not less than two times.

By making the transverse-to-longitudinal ratio of electrical resistance anisotropic, a resistance in a direction which requires to be lowered decreases and a resistance in a direction which doesn't need to be lowered raises, then the battery substrate has lower electrical resistance with less nickel quantity. Moreover, the desired electrical characteristics can be obtained even with substantially reduced nickel coating amount by the transverse-to-longitudinal ratio for the electrical resistance of not less than two times.

(16) A battery electrode substrate according to (14), wherein the plastic fiber of the unwoven fabric is composed by layering a plurality of web layers and is formed such that axises of a direction of advance of the plurality of web layers cross at not more than 12°.

By making the axises in the direction of web advance during web formation be not more than 12°, the fibers of the unwoven fabric align in a single direction, the electrical resistance in the direction of advance during web formation can be reduced, and substrate that has the transverse-to-longitudinal ratio in the electrical resistance of not less than two times can be obtained.

(17) A battery electrode substrate according to (14), wherein the plastic fiber of the unwoven fabric has a core/sheath composite fiber structure in which the core is polypropylene (PP), the sheath is polyethylene (PE) and a core/sheath ratio of PP/PE is not more than 0.8.

When a unwoven fabric is produced with aligning the web's direction of advance, the bonding angles at the intersections of the fibers of the unwoven fabric are small, then the problem of a high average electrical resistance in both the longitudinal and transverse directions arises. However, bonding at the fiber intersections is improved by making the PP/PE ratio not more than 0.8, and an average electrical resistance that is equal to that for an angle of intersection of at least 30° is obtained. Thereby, the features of the unwoven fabric structure according to the invention appears more clearly.

(18) A battery electrode substrate according to (14), wherein for incorporation in a cylindrical battery, the plastic fiber of the unwoven fabric is wound around an axis of direction of a small electrical resistance in the metallic porous body.

Winding around an axis that is parallel to the direction of advance of the unwoven fabric web almost completely eliminates fiber bending and prevents an increase of the resistance. Small resistance values are thereby maintained, and because of this the features of the unwoven fabric structure according to the invention are more clearly expressed.

The following method can be used to fabricate an electrode substrate according to the invention that uses a metallic porous body in which the transverse-to-longitudinal ratio of the electrical resistance is not less than two times. First, in the fabrication process for the plastic fibers of the unwoven fabric, a web is formed using a carding machine or the like and when a plurality of layers of the web are stacked, the web is layered such that the horizontal axis in the web's direction of advance is less than 30°. The axis of the next web layer to be stacked and the axis of the underlaid web layer form an angle of less than 30°. Preferably, the web is layered with the angle of not more than 12°. Layering is more preferably carried out with not more than 10°. The web is then heat-fused by heating and compressing, and wound up to produce a hoop-shaped unwoven fabric.

A conduction treatment is then carried out by forming a layer of an electroconductive metal on the surface of the unwoven fabric by a vacuum film growth method such as vacuum deposition or sputtering, or by electroless plating. A 50 g/m$^2$ to 300 g/m$^2$ nickel film is finally formed to coat by nickel electroplating to produce the metallic porous body.

The technical effects afforded by this invention are summarized below.

Use of a battery electrode substrate utilized the collector of this invention enables cost cut and enhanced battery characteristics while maintaining the strength and electroconductivity appropriate for an electrode substrate. Moreover, a remarkably strong, flexible electrode substrate is obtained in accordance with the invention since the plastic fiber remains as the core material. Because of the presence of the coarse/fine structure that is suitable for electron collection and active substance retention, a battery that exhibits a high capacity and excellent high-rate charge/discharge characteristics can be realized.

In particular, with regard to the fabrication process of cylindrical batteries in which the electrodes are wound, the coarse/fine structure in the thickness direction in accordance with the invention improves filling characteristics for the active substance, and lowers short circuit at winding, therefore battery fabrication cost can be reduced.

The invention also makes it possible to obtain a battery substrate that shows a low electrical resistance with low nickel volume by increasing electrical resistance ratio, which serves to decrease the resistance of the direction in which a lowered electrical resistance is required and to raise the resistance in the direction in which a lowered resistance is not required.

By setting the axis in the direction of advance at not more than 12° during web formation, the fibers in the unwoven fabric align in a single direction and a electrical resistance decreases in the direction of advance during web formation; therefore a battery substrate that has a low electrical resistance with even lower nickel quantity can be obtained.

When unwoven fabric is produced with alignment of the direction of advance of web, bonding angles at the intersections of the fibers in the unwoven fabric become smaller, arising the problem of an increased electrical resistance. However, bonding at the fiber intersections is increased by making the PP/PE ratio be at not more than 0.8, achieving a low electrical resistance.

Bending of the unwoven fabric fibers in the winding process results in an increase of electrical resistance when the unwoven fabric web is wound around an axis perpendicular to the direction of web advance. In contrast, there is almost no bending of the fibers when winding is performed around an axis that is parallel, preventing the increase in resistance.

Furthermore, because the axis of winding and the direction of web advance are parallel, the resistance in the direction of collection in the battery is reduced, and excellent battery output characteristics are obtained as a result.

BEST MODE FOR CARRYING OUT THE INVENTION

Figure 1:
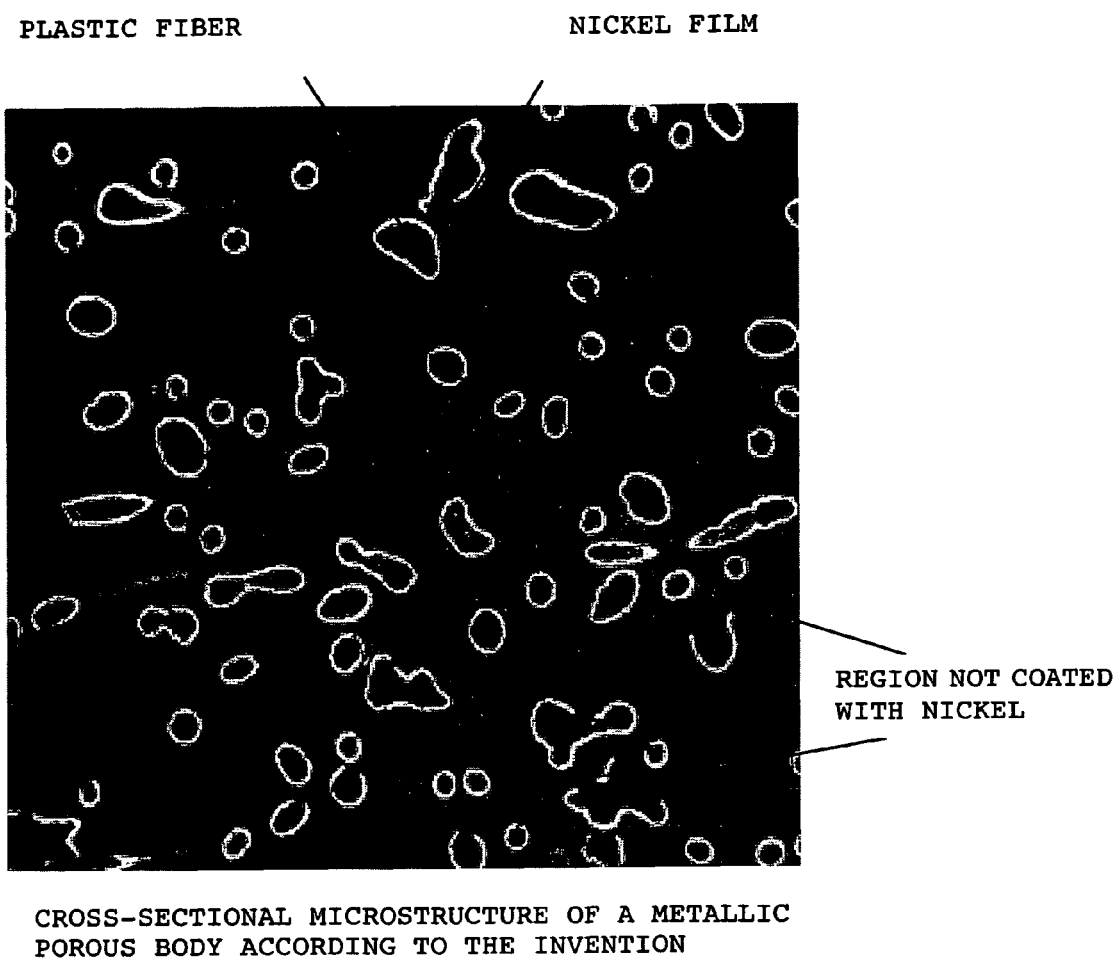
FIG. 1 is a cross-sectional view of the observed metallic porous body of a battery electrode according to the invention.
Figure 2:
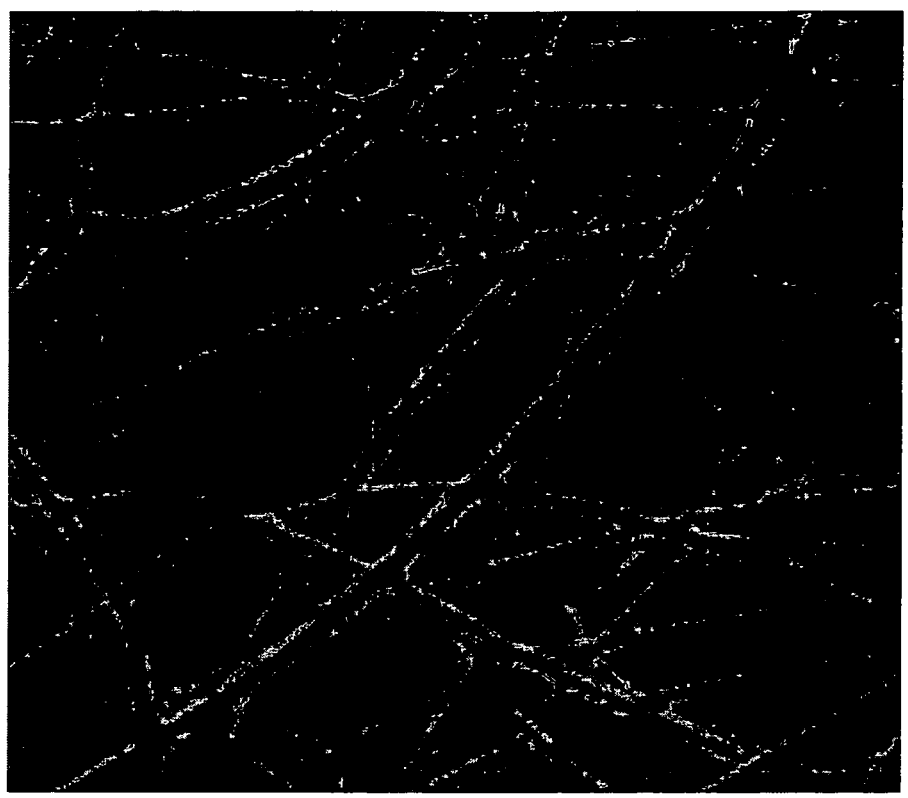
FIG. 2 is the observed image of the metallic porous body of a battery electrode according to the invention.
Figure 3:
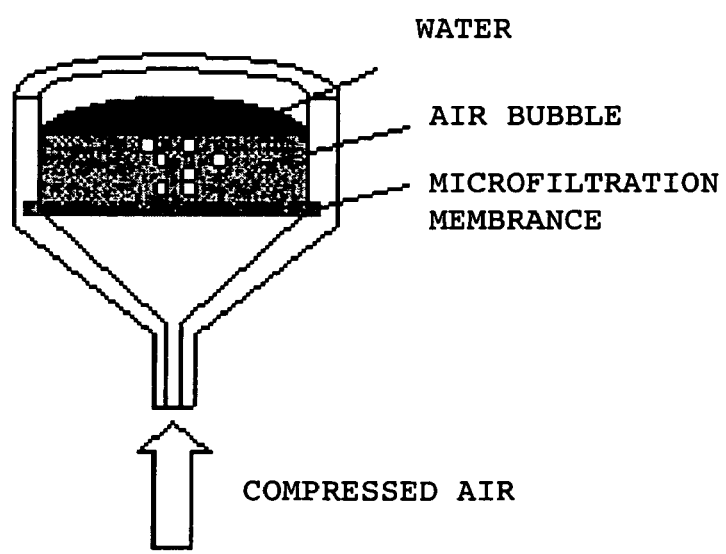
FIG. 3 is a drawing to explain the bubble point method.
Figure 4:
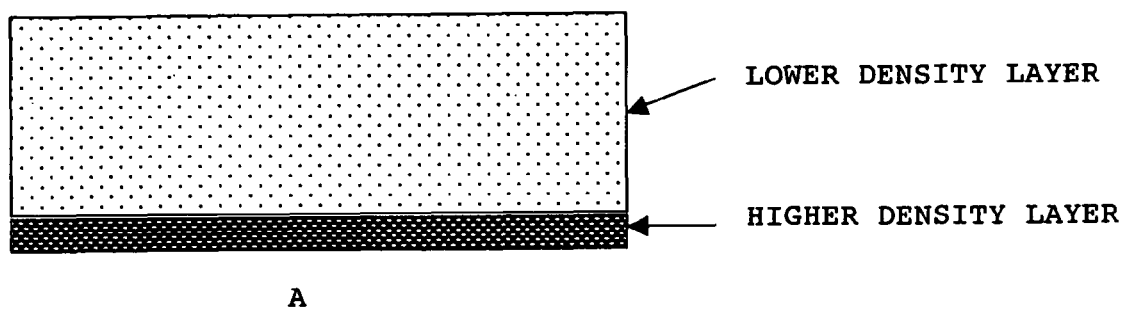
FIG. 4 is a cross-sectional schematic drawing of the metallic porous body of a collector according to the invention. A is a two-layer structure, while B is a three-layer structure in which a higher density layer is sandwiched between lower density layers.
Figure 4:
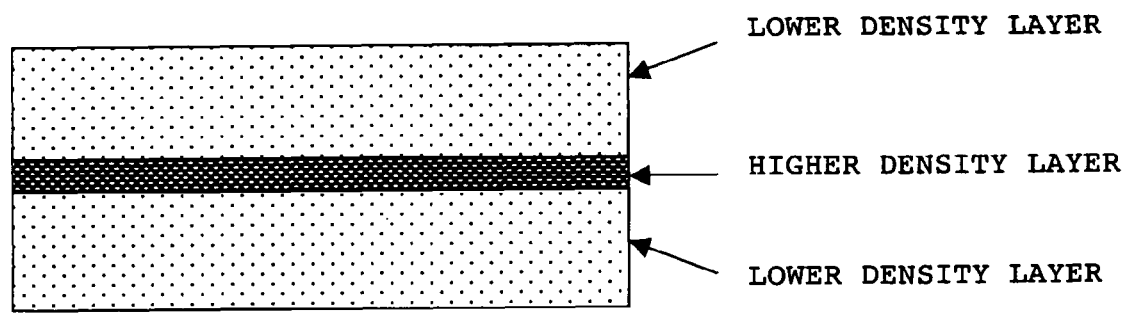

The invention is specifically described below through the Examples and Comparative Examples.

Example 1

Unwoven fabric material having a 30% cumulative volume of pore size (D30) of 36 μm and comprising PP/PE composite fiber with a fiber diameter of 2.2 dtex and a core/sheath ratio of 1/1 was used as the plastic fiber. A conduction treatment was carried out on this unwoven fabric by forming thereon a 0.8 g/m$^2$ nickel film by sputtering. The fiber surface was thereafter coated with nickel by electroplating to produce individual metallic porous body electrode substrates designated as Nos. 3 to 10. Table 1 below shows the areal densities, the nickel film coverage ratios measured from the cross-sectional structures, and the electrical resistance values of the produced metallic porous bodies with unwoven fabric structure.

TABLE 1

| sample No. | areal density (g/m$^2$) <thickness 0.8 mm> | average coverage ratio by the nickel film (%) | electrical resistance *1 (mΩ) |
|---|---|---|---|
| 1 | 150 | 76 | 195 |
| 2 | 150 | 81 | 149 |
| 3 | 150 | 86 | 124 |
| 4 | 150 | 92 | 120 |
| 5 | 150 | 98 | 113 |
| 6 | 50 | 96 | 210 |
| 7 | 100 | 96 | 155 |
| 8 | 200 | 96 | 73 |
| 9 | 300 | 96 | 56 |
| 10 | 400 | 96 | 43 |

*1 Electrical resistance value for the area of 10 mm wide and 100 mm long.

Next, a nickel electrode of a nickel-hydrogen battery was fabricated using the individual sample substrates of Nos. 3 to 10 in Table 1. After filling an active substance whose main component was nickel hydroxide into the substrate, the surface was leveled, and it was dried for 1 hour at 120° C. The resulting electrode was compressed under a pressure of 1 ton/cm$^2$ to provide a longitudinal length of 180 mm, transverse width of 220 mm, and thickness of 0.6 mm. A square sealed nickel-hydrogen battery was composed of five sheets of each nickel electrode thus obtained, six sheets of a known misch metal-nickel (MmNi)-type hydrogen storage alloy electrode as the counter electrode, and hydrophilicized PP unwoven fabric separators. The electrolyte was prepared by dissolving 25 g/L lithium hydroxide in aqueous KOH solution with a specific gravity of 1.3.

The individual batteries thus fabricated were assigned battery numbers 3B, 4B, 5B, . . . , respectively, in correspondence to the number of the sample in Table 1 that was used in the battery. The discharge voltage and capacity were examined for each battery at discharge currents of 10 A and 150 A. For life testing, the capacity retention percentage was evaluated after 1000 cycles at a 10 A discharge. The results are given in Table 2 below.

TABLE 2

| Sample No. | 10 A discharge | | 150 A discharge | | Capacity retention after 1000 cycles (%) |
|---|---|---|---|---|---|
| | V | Ah | V | Ah | |
| 1B | 1.10 | 107 | 1.01 | 91 | 69 |
| 2B | 1.13 | 110 | 1.02 | 92 | 73 |
| 3B | 1.20 | 117 | 1.12 | 108 | 86 |
| 4B | 1.22 | 119 | 1.15 | 110 | 89 |
| 5B | 1.22 | 119 | 1.16 | 112 | 91 |
| 6B | 1.15 | 117 | 1.05 | 101 | 83 |
| 7B | 1.18 | 115 | 1.10 | 107 | 90 |
| 8B | 1.23 | 119 | 1.17 | 113 | 92 |
| 9B | 1.24 | 120 | 1.18 | 118 | 91 |
| 10B | 1.24 | 122 | 1.19 | 119 | 91 |

When charge/discharge was repeated up to 3000 cycles for these batteries, battery 10B short-circuited at cycle 1653, but the other batteries underwent charge/discharge without problems. These results clearly demonstrate that the battery electrode substrates according to the invention exhibit excellent characteristics.

Comparative Example 1

For comparison to above Example 1, metallic porous body electrode substrates Nos. 1 and 2, which had low nickel film coverage ratios, were fabricated in the same way as in Example 1 with the exception that the coverage ratio was reduced. The areal densities, coverage ratios of the nickel films and electrical resistances of the metallic porous bodies are given in Table 1 above for these substrates along with the values of the Example. Using these substrates, Ni-hydrogen batteries were also fabricated and evaluated in the same manner as in the Example. The results are given in Table 2 above along with the values of the Example.

Example 2

Conduction treatment, in which a 1.5 g/m² nickel film was formed by sputtering, was carried out on each of the unwoven fabrics Nos. 11 to 18 specified in Table 3 below. This treatment was performed so as to be an average coverage ratio of 95% thus the respective metallic porous body electrode substrates were obtained. The electrical resistance of each of the obtained substrates is shown in Table 3. The nickel areal density was 180 g/m² for all of these metallic porous body substrates.

TABLE 3

| Sample No. | PP (core)/PE (sheath) ratio of the fiber (3.3 dtex) in the unwoven fabric | Cumulative volume of pore size (%) (D30) | Electrical resistance *1 (mΩ) |
| --- | --- | --- | --- |
| 11 | 1/0 | 41 | 192 |
| 12 | 5/1 | 41 | 165 |
| 13 | 2/1 | 41 | 103 |
| 14 | 1/1 | 41 | 89 |
| 15 | 1/1 | 14 | 87 |
| 16 | 1/1 | 110 | 89 |
| 17 | 1/2 | 41 | 83 |
| 18 | 1/4 | 41 | 78 |

*1 Electrical resistance value for the area of 10 mm wide and 100 mm long.

Nickel-hydrogen batteries were fabricated in the same way as Example 1 using the substrates of Nos. 11 to 18 described in Table 3. As in Example 1, the individual batteries were assigned battery numbers 11B, 12B, 13B, . . . , respectively, in correspondence to the sample number in Table 3. The performances of these batteries were evaluated and the results are given in Table 4 below.

TABLE 4

| Sample No. | 10 A discharge | | 150 A discharge | | Capacity retention after 1000 cycles (%) |
| --- | --- | --- | --- | --- | --- |
| | V | Ah | V | Ah | |
| 11B | 1.14 | 111 | 1.03 | 93 | 82 |
| 12B | 1.17 | 113 | 1.09 | 106 | 85 |
| 13B | 1.19 | 117 | 1.14 | 109 | 89 |
| 14B | 1.22 | 118 | 1.16 | 112 | 91 |
| 15B | 1.23 | 101 | 1.17 | 99 | 91 |
| 16B | 1.12 | 117 | 1.02 | 91 | 80 |
| 17B | 1.23 | 118 | 1.16 | 112 | 91 |
| 18B | 1.23 | 119 | 1.17 | 113 | 92 |

As shown in the results of Table 4, battery No. 15B had a small capacity because the pore size was too small to be filled with sufficient active substance. In the case of battery No. 16B, a large pore size of the substrate resulted in large gaps between the active substance and adjacent substrate fibers, causing a decline in collection performance and in turn capacity lowering at the 150 A high-rate discharge.

Example 3

Unwoven fabric with a two-layer structure was fabricated as the plastic fiber; the two-layer structure was composed of a higher density layer with a thickness of 0.1 mm and a weight per area of 40 g/m² that used PP/PE composite fiber with a core/sheath ratio of 3/7 and a fiber diameter of 0.8 dtex, and also composed of a lower density layer with a thickness of 0.7 mm and a weight per area of 35 g/m² that used PP/PE composite fiber with a core/sheath ratio of 5/5 and a fiber diameter of 3.6 dtex. This unwoven fabric was given conductivity by forming a 1.8 g/m² nickel film by sputtering. The fiber surface was thereafter coated with nickel by electroplating to produce collectors comprising individual metallic porous bodies of Nos. 21 to 25. The densities, the nickel film coverage ratios measured from the cross-sectional structures, and the electrical resistance values are shown in Table 5 below as for the fabricated metallic porous bodies with unwoven fabric structure.

TABLE 5

| Sample No. | Density (g/cc) | | Average coverage ratio by the nickel film (%) | Electrical resistance *1 (mΩ) |
| --- | --- | --- | --- | --- |
| | Lower density region | Higher density region | | |
| 21 | 0.15 | 1.5 | 79 | 103 |
| 22 | 0.15 | 1.5 | 88 | 68 |
| 23 | 0.15 | 1.5 | 93 | 61 |
| 24 | 0.15 | 2.2 | 93 | 52 |
| 25 | 0.12 | 1.5 | 93 | 62 |

*1 Electrical resistance value for the area of 10 mm wide and 100 mm long.

A nickel electrode of Ni-hydrogen battery was fabricated using the individual collectors of sample Nos. 21 to 25 in Table 5. After filling an active substance whose main component was nickel hydroxide into the collector, the surface was leveled and it was dried for 1 hour at 120° C. The resulting electrode was compressed under a pressure of 1 ton/cm² to provide a longitudinal length of 180 mm, transverse width of 220 mm and thickness of 0.4 mm. A square sealed nickel-hydrogen battery was fabricated using five sheets of each nickel electrode thus fabricated, six sheets of a known misch metal-nickel (MmNi)-type hydrogen storage alloy electrode as the counter electrode; and hydrophilicized PP unwoven fabric separators. The electrolyte was prepared by dissolving 25 g/L lithium hydroxide in aqueous KOH solution with a specific gravity of 1.3.

The individual batteries thus produced were assigned battery numbers 21B, 22B, 23B, . . . , respectively, in correspondence to the number of the sample in Table 5 that was used in the battery. The discharge voltage and capacity were examined for each battery at discharge currents of 10 A and 200 A. For life testing, the capacity retention percentage was evaluated after 1000 cycles at a 50 A discharge. The results are given in Table 6 below.

TABLE 6

| Sample No. | 10 A discharge | | 200 A discharge | | Capacity retention after 1000 cycles (%) |
| --- | --- | --- | --- | --- | --- |
| | V | Ah | V | Ah | |
| 21B | 1.20 | 42 | 1.01 | 33 | 71 |
| 22B | 1.23 | 48 | 1.09 | 42 | 90 |
| 23B | 1.24 | 50 | 1.11 | 44 | 91 |
| 24B | 1.25 | 51 | 1.12 | 46 | 92 |
| 25B | 1.24 | 50 | 1.11 | 44 | 91 |

Comparative Example 2

Metallic porous body electrode substrate No. 21, which had a low nickel film coverage ratio, is Comparative Example.

Example 4

Conduction treatment was carried out on each of the unwoven fabrics Nos. 26 to 30 specified in Table 7 below by forming a 1.0 g/m² nickel film by sputtering. The fiber surface was further coated with nickel by electroplating so as to be an average coverage ratio of 95% and the respective metallic porous body electrode substrates were thus obtained. The electrical resistance of each of the obtained substrates is shown in Table 7. All of the metallic porous bodies had a lower density region and a higher density region; the higher region had a thickness of 0.6 mm and a density of 0.15 g/cc, and the lower region had a thickness of 0.1 mm and a density of 1.7 g/cc.

TABLE 7

| Sample No. | Lower density region (fiber diameter of 2.2 dtex) | | Higher density region (fiber diameter of 0.6 dtex) | | Electrical resistance *1 (mΩ) |
| --- | --- | --- | --- | --- | --- |
| | PP/PE ratio | weight per area (g/m²) | PP/PE ratio | weight per area (g/m²) | |
| 26 | 4/1 | 35 | 4/1 | 40 | 78 |
| 27 | 2/1 | 35 | 2/1 | 35 | 67 |
| 28 | 2/3 | 30 | 2/3 | 35 | 57 |
| 29 | 3/7 | 30 | 3/7 | 35 | 52 |
| 30 | 1/4 | 30 | 1/4 | 40 | 50 |

*1 Electrical resistance value for the area of 10 mm wide and 100 mm long.

Nickel-hydrogen batteries were fabricated in the same manner as Example 3 using the substrates Nos. 26 to 30 described in Table 7. As in Example 3, the individual batteries were assigned battery numbers 26B, 27B, 28B, . . . , respectively, in correspondence to the sample number in Table 7. The performances of these batteries were evaluated and the results are given in Table 8 below.

TABLE 8

| Sample No. | 10 A discharge | | 200 A discharge | | Capacity retention after 1000 cycles (%) |
| --- | --- | --- | --- | --- | --- |
| | V | Ah | V | Ah | |
| 26B | 1.21 | 45 | 1.05 | 38 | 83 |
| 27B | 1.23 | 49 | 1.09 | 43 | 91 |
| 28B | 1.24 | 50 | 1.11 | 45 | 92 |
| 29B | 1.25 | 52 | 1.13 | 47 | 92 |
| 30B | 1.25 | 53 | 1.14 | 49 | 93 |

Example 5

Unwoven fabric that had a two-layer structure was fabricated as the plastic fiber; this two-layer structure was composed of a higher density layer with a thickness of 0.1 mm and a weight per area of 35 g/m² that used PP/PE composite fiber with a core/sheath ratio of 3/7 and a fiber diameter of 0.6 dtex, and composed of a lower density layer with a thickness of 0.6 mm and a weight per area of 30 g/m² that used PP/PE composite fiber with a core/sheath ratio of 5/5 and a fiber diameter of 4.2 dtex. Next, this unwoven fabric was provided with conductivity by forming a 1.3 g/m² nickel film by sputtering. The fiber surface was thereafter coated with nickel by electroplating, adjusting the amount of Ni plating by changing the distance between the material being treated and the anode electrode, to produce collectors comprising the individual metallic porous bodies of Nos. 31 to 36. The densities, the nickel film coverage ratios measured from the cross-sectional structures, and the electrical resistance values are shown in Table 9 below for the fabricated metallic porous bodies having unwoven fabric structure.

TABLE 9

| Sample No. | Density (g/cc) | | Average coverage ratio by the nickel film (%) | Electrical resistance *1 (mΩ) |
| --- | --- | --- | --- | --- |
| | Lower density region | Higher density region | | |
| 31 | 0.08 | 1.5 | 85 | 78 |
| 32 | 0.15 | 0.7 | 94 | 111 |
| 33 | 0.15 | 1.3 | 94 | 63 |
| 34 | 0.15 | 2.1 | 94 | 48 |
| 35 | 0.3 | 1.5 | 94 | 57 |
| 36 | 0.8 | 1.5 | 94 | 46 |

*1 Electrical resistance value for the area of 10 mm wide and 100 mm long.

Nickel-hydrogen batteries were fabricated in the same manner as Example 3 using the collectors in Table 9. The individual batteries were assigned battery numbers 31B, 32B, 33B, . . . , respectively, in correspondence to the sample number in Table 9. The performances of these batteries were evaluated and the results are given in Table 10 below.

TABLE 10

| Sample No. | 10 A discharge | | 200 A discharge | | Capacity retention after 1000 cycles (%) |
| --- | --- | --- | --- | --- | --- |
| | V | Ah | V | Ah | |
| 31B | 1.23 | 44 | 1.03 | 38 | 80 |
| 32B | 1.24 | 49 | 1.01 | 36 | 82 |
| 33B | 1.24 | 50 | 1.11 | 44 | 91 |
| 34B | 1.25 | 53 | 1.14 | 48 | 93 |
| 35B | 1.24 | 51 | 1.12 | 45 | 91 |
| 36B | 1.25 | 46 | 1.10 | 41 | 79 |

Battery 36B was disassembled to examine after the cycling test, and as a result ruptures and exfoliations were observed in a portion of the nickel film in the lower density region. It is understood that those defects were caused the impaired cycle characteristics.

Example 6

Unwoven fabric that had a thickness of 0.4 mm and was composed of PP/PE composite fiber with a fiber diameter of 2.2 dtex and a core/sheath ratio of 1/1 was used as the plastic fiber. This unwoven fabric was given conductivity by the treatment of forming a 0.8 g/m² nickel film by sputtering. The fiber surface was further coated with nickel by gradient electroplating as shown in below, to fabricate individual metallic porous body electrode substrates of Nos. 37 to 40. The plating thickness was measured at 10 locations on both of the lower density side of the fabricated metallic porous bodies with unwoven fabric structure and the higher density side thereof, and the average values of these measured results are given in Table 11 below. The plating thickness was measured as follows: the metallic porous body of the electrode substrate was embedded in epoxy resin and polished; the cross-sectional structure thereof along the thickness direction was observed with an optical microscope. The average ratio of the nickel film coverage, which was evaluated at the same time, was 97%.

TABLE 11

| No. | Higher density region (t 0.1 mm) | | Lower density region (t 0.3 mm) | | Electrical resistance *1 (mΩ) |
|---|---|---|---|---|---|
| | Plating thickness (μm) | Density (g/cc) | Plating thickness (μm) | Density (g/cc) | |
| 37 | 4.2 | 0.75 | 4.2 | 0.75 | 53 |
| 38 | 5.3 | 0.95 | 3.2 | 0.57 | 43 |
| 39 | 4.6 | 0.82 | 3.7 | 0.66 | 45 |
| 40 | 4.5 | 0.80 | 3.4 | 0.61 | 46 |

*1 Electrical resistance value for the area of 10 mm wide and 100 mm long.

Sample No. 38 in Table 11 was electroplated to provide different plating thicknesses on the two sides as follows: the aforementioned conduction-treated unwoven fabric was immersed in ion-exchanged water at room temperature to remove bubbles; nickel anode cases were positioned on both sides of the work in a nickel sulfamate bath in which a nickel concentration of 100 G·L; and the applied voltage was adjusted to set the current density at 20 dA/cm$^2$ and 10 dA/cm$^2$.

Comparative sample No. 37, in which the plating thicknesses on the two sides were equal, was prepared in the same way by making the current density be 15 dA/cm$^2$ on both sides.

Sample No. 39 was electroplated to give different plating thicknesses on the two sides by changing the distance between the sample work and the anode case, at 25 mm for one side and 60 mm for the other side.

Sample No. 40 was prepared by using the same current density of 15 dA/cm$^2$ on both sides. However, the anode case length was changed that it was at 2.4 m for one side and 1.4 m for the other side, and the sample was plated continuously while passing the work through between these anode cases at a speed of 8 cm/minute.

Nickel-hydrogen batteries were fabricated in the same way as Example 3 using the collectors in Table 11. The individual batteries were assigned battery numbers 37B, 38B, 39B, ..., respectively, in correspondence to the sample number in Table 11. The performances of these batteries were evaluated and the results are given in Table 12 below.

TABLE 12

| Sample No. | 10 A discharge | | 200 A discharge | | Capacity retention after 1000 cycles (%) |
|---|---|---|---|---|---|
| | V | Ah | V | Ah | |
| 37B | 1.23 | 35 | 1.12 | 31 | 89 |
| 38B | 1.25 | 38 | 1.16 | 35 | 94 |
| 39B | 1.24 | 37 | 1.15 | 34 | 93 |
| 40B | 1.24 | 37 | 1.15 | 34 | 93 |

The collector according to the invention is utilized for a catalyst electrode, water treatment electrode, or other types of electrode substrate, either directly or after filling with a material other than a battery active substance, e.g., a catalytic substance.

Example 7

The various kinds of metallic porous bodies shown in Table 13 below were fabricated by the above-mentioned production method. In the process, the web was layered such that the axis in the web's direction of advance was not more than 10° for Nos. 41 to 48 (Example) and the axis was not less than 30° for Nos. 49 to 52 (Comparative Example). The electrical resistance of the metallic porous bodies thus obtained was measured and the results are shown in Table 13.

TABLE 13

| | No. | Unwoven fabric | | | Ni weight per area | Conduction treatment method | Angle | Electrical resistance | | |
|---|---|---|---|---|---|---|---|---|---|---|
| | | Fiber ratio | Thickness | Weight per area | | | | Longi-tudinal | Trans-verse | Ratio |
| Ex. | 41 | PP/PE = 0.6 | 0.9 | 60 | 200 | sputtering | 0 | 47 | 175 | 3.7 |
| | 42 | PP/PE = 0.7 | 0.9 | 60 | 100 | sputtering | 0 | 120 | 419 | 3.5 |
| | 43 | PP/PE = 0.7 | 1.0 | 50 | 200 | sputtering | 0 | 55 | 200 | 3.6 |
| | 44 | PP/PE = 0.7 | 1.0 | 50 | 100 | sputtering | 0 | 177 | 518 | 3.0 |
| | 45 | PP/PE = 0.8 | 0.7 | 50 | 200 | electroless Ni plating | 8 | 80 | 163 | 2.0 |
| | 46 | PP/PE = 0.8 | 0.9 | 60 | 200 | sputtering | 10 | 88 | 177 | 2.0 |
| | 47 | PP/PE = 0.6 | 0.9 | 60 | 150 | sputtering | 10 | 121 | 263 | 2.2 |
| | 48 | PP/PE = 0.8 | 0.9 | 60 | 100 | sputtering | 10 | 214 | 495 | 2.3 |
| Comp. Ex. | 49 | PP/PE = 0.8 | 0.9 | 70 | 200 | sputtering | 30 | 79 | 118 | 1.5 |
| | 50 | PP/PE = 0.8 | 0.9 | 70 | 150 | sputtering | 30 | 107 | 159 | 1.5 |
| | 51 | PP/PE = 0.8 | 0.9 | 60 | 200 | sputtering | 45 | 88 | 98 | 1.1 |
| | 52 | PP/PE = 0.8 | 0.9 | 60 | 100 | sputtering | 45 | 231 | 253 | 1.1 |

The unit for weight per area is g/m$^2$.

Next, the nickel electrode of Ni-hydrogen battery was fabricated using the metallic porous bodies shown in Table 13. After filling an active substance whose main component was nickel hydroxide into the porous body, the surface was leveled, and it was dried for 1 hour at 120° C. The resulting electrode was compressed under a pressure of 1 ton/cm$^2$ to provide a longitudinal length of 70 mm, transverse width of 150 mm, and thickness of 0.4 mm. A square sealed nickel-hydrogen battery was fabricated using 10 sheets of each nickel electrode thus obtained, 11 sheets of a known misch metal-nickel (MmNi)-type hydrogen storage alloy electrode as the counter electrode, and hydrophilicized PP unwoven fabric separators. Here, leads were connected to each electrode so that they were longitudinal collection, which exhibits low electrical resistance. The electrolyte was prepared by dissolving 25 g/L lithium hydroxide in aqueous KOH solution with a specific gravity of 1.3.

The individual batteries thus fabricated were assigned battery numbers 41B, 42B, 43B, . . . , respectively, in correspondence to the number of sample in Table 13 that was used in the battery. The discharge voltage and capacity were examined for each battery at 10 A and 100 A. For life testing, the capacity retention percentage was evaluated after 1000 cycles at a 50 A discharge. The results are given in Table 14.

TABLE 14

| Sample | 10 A discharge | | 100 A discharge | | Capacity retention after 1000 cycles |
| --- | --- | --- | --- | --- | --- |
| No. | V | Ah | V | Ah | (%) |
| 41B | 1.24 | 27 | 1.11 | 24 | 91 |
| 42B | 1.20 | 26 | 1.06 | 19 | 89 |
| 43B | 1.24 | 27 | 1.10 | 23 | 91 |
| 44B | 1.20 | 25 | 1.05 | 19 | 88 |
| 45B | 1.22 | 26 | 1.08 | 21 | 90 |
| 46B | 1.22 | 25 | 1.07 | 20 | 90 |
| 47B | 1.20 | 26 | 1.06 | 19 | 90 |
| 48B | 1.18 | 23 | 1.03 | 18 | 87 |
| 49B | 1.17 | 22 | 1.02 | 17 | 85 |
| 50B | 1.15 | 21 | 1.00 | 16 | 82 |
| 51B | 1.14 | 22 | 1.00 | 15 | 82 |
| 52B | 1.11 | 18 | 0.96 | 12 | 77 |

Example 8

Cylindrical Ni-hydrogen batteries were fabricated using the metallic porous body of No. 41 in Table 13. For the nickel electrode, an active substance whose main component was nickel hydroxide was filled, after which the surface was leveled, followed by drying for 1 hour at 120° C. The resulting electrode was compressed under a pressure of 1 ton/cm$^2$ to provide a longitudinal length of 40 mm, transverse width of 350 mm and thickness of 0.3 mm. A sealed cylindrical nickel-hydrogen battery was assembled by winding this nickel electrode, a known MmNi-type hydrogen storage alloy electrode and hydrophilicized PP unwoven fabric separator. The electrolyte was prepared by dissolving 25 g/L lithium hydroxide in aqueous KOH solution with a specific gravity of 1.3. 1SBA designates a battery in which the nickel electrode was wound around the axis of longitudinal direction of the porous body, which shows low electrical resistance. In this Example, 1SBB designates a battery in which the winding direction was the longitudinal direction of low electrical resistance. The discharge voltage and capacity of each battery were investigated at a 1 A discharge and a 10 A discharge. For life testing, the capacity retention percentage was determined after 500 cycles at a 1 A discharge. The results are given in Table 15.

TABLE 15

| Sample | 1 A discharge | | 10 A discharge | | Capacity retention after |
| --- | --- | --- | --- | --- | --- |
| No. | V | Ah | V | Ah | 500 cycles (%) |
| 1SBA | 1.24 | 2.5 | 1.14 | 2.1 | 92 |
| 1SBB | 1.22 | 2.4 | 1.06 | 1.7 | 88 |

This invention enables the production of a battery substrate that exhibits a low electrical resistance at low nickel volume, which can be utilized in, for example, alkaline secondary batteries.

The invention claimed is:

1. A battery electrode substrate comprising a metallic porous body, the metallic porous body having a structure in which a surface of a plastic fiber in a woven or unwoven fabric is coated with a nickel film, and the nickel film coating the surface with an average coverage ratio of not less than 85%.

2. A battery electrode substrate according to claim 1, wherein the plastic fiber has a core/sheath composite fiber structure whose core is polypropylene (PP) and whose sheath is polyethylene (PE), and a core/sheath ratio of the PP/PE is within a range of 2/1 to 1/4.

3. A battery electrode substrate according to claim 1, wherein an areal density of said nickel film is not less than 50 g/m$^2$ and not more than 300 g/m$^2$.

4. A battery electrode substrate according to claim 1, wherein a 30% cumulative volume of a pore size of the metallic porous body in a pore size measurement by a bubble point method is not less than 20 μm and not more than 100 μM.

5. A method for producing a battery electrode substrate according to claim 1, comprising a step of producing the metallic porous body, the step comprising:
   forming a nickel film whose areal density is of 0.3 g/m$^2$ to 10 g/m$^2$ on a surface of a plastic fiber of a woven or unwoven fabric by a vapor-phase method selected from a sputtering method, a vacuum deposition method, and an ion plating method, and
   further coating the surface with a nickel film by electroplating.

6. A collector comprising a metallic porous body, wherein the metallic porous body has a structure in which a surface of a plastic fiber of a woven or unwoven fabric is coated with a nickel film so as to be an average coverage ratio of not less than 85%, the metallic porous body comprises at least two layers of a lower density region and a higher density region in a thickness direction between which there is a difference in density of included nickel, and a thickness of the lower density region is not less than 1.5-times a thickness of the higher density region.

7. A collector according to claim 6, wherein the plastic fiber has a core/sheath composite fiber structure whose core is polypropylene (PP) and whose sheath is polyethylene (PE), and a core/sheath ratio of the PP/PE is in the range of 2/1 to 1/4.

8. A collector according to claim 6, wherein a density of nickel included in the higher density region is not less than 0.8 g/cc and not more than 4 g/cc, and a density of nickel included in the lower density region is less than 0.8 g/cc but not less than 0.1 g/cc.

9. A battery electrode substrate, wherein a battery active substance is filled in a collector according to claim 6.

10. A method for producing a collector according to claim 6, comprising a step of producing the metallic porous body, the step comprising:

preparing a woven or unwoven fabric comprising a plastic fiber that comprises at least two layers of a lower density region and a higher density region in a thickness direction between which there is a difference in density of included nickel, with a thickness of the lower density region being not less than 1.5-times a thickness of the higher density region;

forming a nickel film whose areal density is of 0.3 g/m$^2$ to 10 g/m$^2$ on a surface of the plastic fiber by a vapor-phase method selected from a sputtering method, a vacuum deposition method and an ion plating method; and further coating the surface with a nickel film by electroplating.

11. A method for producing a collector according to claim 6, comprising a step of producing the metallic porous body, the step comprising:

forming a first nickel film whose areal density is of 0.3 g/m$^2$ to 10 g/m$^2$ on a surface of a plastic fiber of an woven or unwoven fabric by a vapor-phase method selected from a sputtering method, a vacuum deposition method and an ion plating method; and further coating the surface with a second nickel film by a gradient electroplating method so as to make the second nickel film comprise at least two layers of a lower density region and a higher density region in a thickness direction in which there is a difference in density of nickel included and a thickness of the lower density region is not less than 1.5-times a thickness of the higher density region.

12. A method for producing a battery electrode substrate according to claim 9, comprising the steps of:

fabricating the metallic porous body by a process comprising the steps of:

preparing a woven or unwoven fabric as a base material, the fabric comprising a plastic fiber that comprises at least two layers of a lower density region and a higher density region in a thickness direction between which there is a difference in density of included nickel, and a thickness of the lower density region being not less than 1.5-times a thickness of the higher density region, forming a nickel film whose areal density is of 0.3 g/m$^2$ to 10 g/m$^2$ on a surface of the plastic fiber by a vapor-phase method selected from a sputtering method, a vacuum deposition method, and an ion plating method, and further coating the surface with a nickel film by electroplating;

fabricating a collector by use of the metallic porous body; and filling a battery active substance in the collector.

13. A method for producing a battery electrode substrate according to claim 9, comprising the steps of:

fabricating the metallic porous body by a process comprising the steps of:

forming a first nickel film whose areal density is of 0.3 g/m$^2$ to 10 g/m$^2$ on a surface of the plastic fiber of an woven or unwoven fabric by a vapor-phase method selected from a sputtering method, a vacuum deposition method and an ion plating method, and further coating the surface with a second nickel film by a gradient electroplating method so as to make the second nickel film comprise at least two layers of a lower density region and a higher density region in a thickness direction in which there is a difference in density of nickel included and a thickness of the lower density region is not less than 1.5-times a thickness of the higher density region;

fabricating a collector by use of the metallic porous body; and filling a battery active substance in the collector.

* * * * *